(12) United States Patent
Winokur

(10) Patent No.: US 6,820,097 B2
(45) Date of Patent: Nov. 16, 2004

(54) SYSTEM AND METHOD FOR CROSS-PLATFORM UPDATE PROPAGATION

(75) Inventor: Alexander Winokur, Haifa (IL)

(73) Assignee: Sepaton, Inc., Southboro, MA (US)

(*) Notice: Subject to any disclaimer, the term of this patent is extended or adjusted under 35 U.S.C. 154(b) by 415 days.

(21) Appl. No.: 10/050,239

(22) Filed: Jan. 16, 2002

(65) Prior Publication Data

US 2002/0152227 A1 Oct. 17, 2002

Related U.S. Application Data

(60) Provisional application No. 60/262,505, filed on Jan. 17, 2001, and provisional application No. 60/262,050, filed on Jan. 16, 2001.

(51) Int. Cl.[7] .............................................. G06F 17/30
(52) U.S. Cl. ..................................... 707/202; 707/204
(58) Field of Search ................................ 707/200, 202, 707/204

(56) References Cited

U.S. PATENT DOCUMENTS

| | | | |
|---|---|---|---|
| 5,799,141 A | | 8/1998 | Galipeau et al. |
| 5,842,222 A | * | 11/1998 | Lin et al. ................ 707/202 |
| 5,991,771 A | | 11/1999 | Falls et al. |
| 5,999,931 A | * | 12/1999 | Breitbart et al. ............ 707/10 |
| 6,014,686 A | | 1/2000 | Elnozahy et al. |
| 6,144,999 A | | 11/2000 | Khalidi et al. |
| 6,173,292 B1 | * | 1/2001 | Barber et al. .............. 707/200 |
| 6,256,675 B1 | | 7/2001 | Rabinovich |
| 6,374,401 B1 | | 4/2002 | Curtis |
| 6,606,685 B2 | * | 8/2003 | Huxoll ...................... 711/118 |

* cited by examiner

*Primary Examiner*—Jack Choules
(74) *Attorney, Agent, or Firm*—Wilmer Cutler Pickering Hale and Dorr LLP

(57) ABSTRACT

A system and method is described for use in the propagation of cross-platform updates of databases in, for example, an Enterprise system. Given that these platforms may be operating using different operating systems and database software, the system and method are not application dependent. The system and method effect the cross-platform propagation of updates through the use of I/O streams. Accordingly, the system and method do not use valuable and expensive CPU cycles nor excessively load the TCP/IP communication lines to perform the desired cross-platform propagation of updates for platform databases.

19 Claims, 3 Drawing Sheets

SYSTEM AND METHOD FOR CROSS-PLATFORM UPDATE PROPAGATION

CROSS REFERENCE TO RELATED APPLICATIONS

This application claims priority to provisional application Ser. No. 60/262,050, entitled "A Method and an Apparatus for Cross DB Update Propagation," filed on Jan. 16, 2001, and claims benefit of Ser. No. 60/262,505 Jan. 17, 2001.

FIELD OF THE INVENTION

The present invention relates to Enterprise systems that have front-end and backend data repositories that require updating. More specifically, the present invention relates to Enterprise systems that have front-end and backend data repositories that require the propagation of cross platform updates.

BACKGROUND OF THE INVENTION

The wide use of the Internet has provided a new mode of business which has been frequently referred to as "e-Business" or "e-Commerce." The heart of e-Business is the ability of system users, which at times are customers to be able to perform a variety of transactions using a web browser or other device that allows them to connect to the Internet. In the context of an "Enterprise," "Enterprise Data" may now be accessed and updated by customers in a much less controlled environment. In Enterprises that are engaged in e-Business where, in fact, customers do have such access, there is a trend to isolate the critical backend data repositories from the front-end data repositories. This is felt necessary to prevent the backend data repositories from being manipulated by customers through web browsers. Further, the front-end and backend data repositories may be different types of systems running different types of database software. For example, the front-end repositories may be S/390 systems from IBM running Database2 software from IBM, Inc., while the backend data repositories may Unix/NT based systems from Sun Microsystem Inc./Microsoft, Inc. running Oracle database software.

Given that front-end and backend data repositories are all part of the same Enterprise system, it is very likely that some of the updates to the backend data repositories will propagate to the front-end data repositories and vice-versa. In order to carryout such cross-platform updates, normally, there is very specialized software components added to the respective platform software to effect the desired update propagation. Generally, platform-to-platform propagation using this software is carried out using the system's Transport Control Protocol/Interface Protocol ("TCP/IP") communications lines.

The add-on software components are expensive to the system in a variety of ways. These expenses include the amount of CPU cycles needed from both the front-end and backend servers, the loading of the TCP/IP communications lines, and there must be specially developed software for each specific enterprise logic. This latter requirement also means that additional supporting cross-system locking mechanisms and logic must be developed. As can be suspected, with the need to handle these issues there is a strong likelihood that applications developed in this environment will have bugs and be susceptible to various types of failures.

As an example, in any two platform system, which includes Enterprise systems with front-end and backend data repositories, there can be real-time consistent update propagation by including transaction application logic to the respective database servers. In the case of the cross platform propagation of updates, one of the transaction applications will be the source transaction application and the other will be the destination transaction application. Each of the transaction application is capable of serving as a source or destination transaction application. Therefore, each is developed so that it is capable of propagating updates that it intercepts to a program location at the destination database of the other platform. The program at the destination database will acquire and retain the appropriate records relating to the updates propagated to the destination database. The destination database will then apply the updates to the destination database.

After the successful update of the destination database, the destination program will transmit a "successful completion status" message to the source transaction application. This message will then permit the sources transaction application to complete its internal processing for the propagation. The system that has just been described, however, uses the respective server CPU cycle times and loads the TCP/IP communications lines to effect update propagation which is undesirable.

There is a need for a system and method the will more efficiently and effectively perform cross-platform update propagation without the problems and expense found in prior systems.

SUMMARY OF THE INVENTION

The system and method of the present invention will effect the efficient and effective cross-platform updating of databases which is not application dependent. The system and method of the present invention do not require additional cross-system locking mechanisms, uses a very limited number of server CPU cycles, and do not use the TCP/IP communications lines.

The system and method of the present invention may be carried out by updates for the respective databases being intercepted as reflected in their respective database logs. The intercepted updates are then applied to the databases by directly writing them to the appropriate database disks. According to the present invention, the interception of the updates and the writing of them to the disks are carried out using the I/O streams, thereby bypassing the need to use the respective different server CPUs and the TCP/IP communications lines. As an example, the I/O streams include Enterprise System Connection ("ESCON"), Small Computer System Interface ("SCSI"), or Fiber Channel streams.

An object of the present invention is to provide a system and method to effectively and efficiently propagate cross-platform updates between two discrete databases systems.

Another object of the present invention is to provide a system and method that will effect cross-platform update propagation without the need to use platform server resources or TCP/IP communication lines.

A further object of the present invention is to provide a system and method that will effect the propagation of cross-platform updates between two discrete database systems at the I/O streams associated with a system that may include the two discrete database systems.

These and other objects will be explained in greater detail in the remainder of the specification, and in light of the drawings and the appended claims.

DETAILED DESCRIPTION OF THE INVENTION

Figure 1:
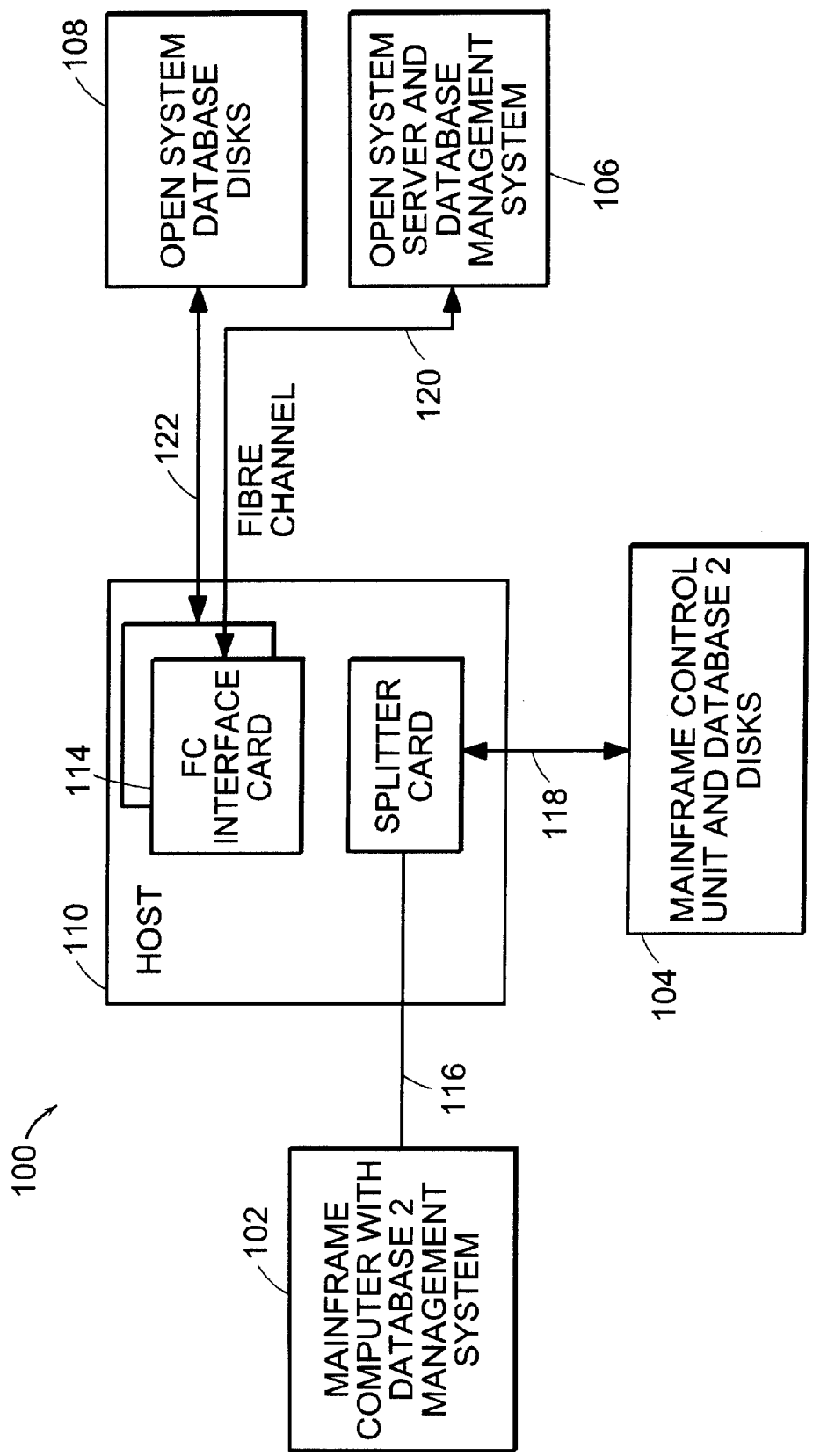
FIG. 1 shows a representative system incorporating the system and method of the present invention.

The system and method of the present invention are directed to the propagation of cross-platform updates of databases in, for example, an Enterprise system. Given that these platforms may be operating using different operating systems and database software, the present invention is not application dependent. The present invention effects the cross-platform propagation of updates through the use of I/O streams. Accordingly, the system and method of the present invention do not use valuable and expensive CPU cycles nor excessively load the TCP/IP communication lines to perform the desired cross-platform propagation of updates.

An overview of the system and method of the present invention is that when there is a system, such as an Enterprise system with at least two platforms, in which cross-platform database updating is desired, the specific updates for the database(s) of a particular platform is intercepted by a system element added for that purpose. The intercepted update information is then written to the log of the original database, the source database, to which the update was intended and to the log of the database for the other platform(s), the target database(s). The updates are then written to the source and target databases in a manner that does not interfere with other activity of the system.

The present invention may be implemented at least in part through a platform that is described in commonly assigned, co-pending U.S. patent application Ser. No. 09/605,438, titled "Device, System, and Method of Intelligently Splitting Information in an I/O System." This application is incorporated herein by reference.

Before describing the system and method of the present invention in greater detail, there are certain terms that will be used in the description that will have the following definitions:

Notations

| | |
|---|---|
| $R_j$ | The identification of a source database record $R_j$. |
| $r_j$ | The identification of a target database record $r_j$. |
| $R_{j,k}$ | An entry in the source database log indicating the update of record $R_j$ by the transaction identified as k. |
| $r_{j,k}$ | An entry in the target database log indicating the update of record $r_j$ by the transaction identified as k. |

Database Transactions

| | |
|---|---|
| T ($R_i$, $R_j$, $R_k$, Read ($R_l$, $R_m$, $R_n$, $R_o$)) | Source database records $R_i$, $R_j$, and $R_k$ are updated based on the values of source records $R_l$, $R_m$, $R_n$, and $R_o$. Therefore, each transaction T has a read domain R, records $R_l$, $R_m$, $R_n$, $R_o$, and an update domain U, records $R_i$, $R_j$, $R_k$. |

Parallel Transactions: Transactions $T_i$ and $T_j$ are parallel if one of the following is true:

1. $T_i$ starts after $T_j$ starts but before $T_j$ ends.
2. $T_j$ starts after $T_i$ starts but before $T_i$ ends.
3. $T_i$ starts before $T_j$ starts and ends after $T_j$ ends.
4. $T_j$ starts before $T_i$ starts and ends after $T_i$ ends.

Atomic Transactions: A transaction T=(R, U) is atomic if for any other parallel transaction $T_i=(R_i, U_i)$, the following is true:

1. There are less than 2 records in (R ∪ U) ∩ $U_i$. This also may be stated as the operation O((R ∪ U) ∩ $U_i$) < 2 (the "atomicity equation"). That is, the transaction $T_i$ cannot change more than one record in either the read or write domain of transaction T.
2. If O((R ∪ U) ∩ $U_i$) > 1, then all read/update operations which violate O((R ∪ U) ∩ $U_i$) < 2, occurred either before T started or after T ended.

Update Propagation: For the purposes of cross-platform propagation the following applies:

1. DB1 and DB2 are two independent database servers running on different systems.
2. DB1 is the source database where the updates originate and DB2 is the target database where the updates will propagate.
3. $R_i$ may be a record that in DB1 and $r_i$ is a corresponding record based on predefined mapping in DB2.
4. T ($R_i$, $R_j$, $R_k$, Read ($R_l$, $R_m$, $R_n$, $R_o$)) is a transaction executed by the source database, then following transaction execution, and after applying the update propagation records $r_i$, $r_j$, and $r_k$, which correspond to $R_i$, $R_j$, $R_k$, will have the same values as $R_i$, $R_j$, $R_k$.

Consistent Update Propagation: This is an update that complies with the following rules:

1. Target database transaction atomicity is not violated. That is, updating $r_i$, $r_j$, and $r_k$, with values of $R_i$, $R_j$, and $R_k$ does not violate the atomicity rules for any of the transactions executed natively by DB2, the target database, in parallel to the update propagation.
2. The atomicity of the transaction represented by the update propagation is not violated by any DB2, the target database, native transaction.

According to consistent update propagation definition, for any target transaction, $T_i=(R_i, U_i)$; and for any source update propagation transaction, T=(U), O((R∪U)∩$U_i$)<2. This shows that an update propagation transaction on the target database DB2 consists only of the update domain, since the update is not dependent on any target database DB2 values. Thus, for update propagation transactions, R=0.

Real-Time Update Propagation: An update propagation that completes execution together with the original transaction that initiated the update propagation.

Database Log: A set of primary and secondary log files consisting of log records that record all changes to a database. The database log is used to roll back changes for transactions that are not committed and to recover a database to a consistent state.

FIG. 1, generally at 100, shows a representative system that incorporates the system and method of the present invention. The system includes mainframe computer 102 that has a database management system ("DBMS") associated with it. The DBMS will control the database system associated with the mainframe. As an example, for mainframe computer could be an IBM S/390 system.

The mainframe control unit and database disks are shown at 104. The mainframe and DBMS at 102 connect to mainframe control unit and database disks at 104 so that information data can be retrieved from, or added to the database disks. The DBMS and database may operate according to Database 2 operating software from IBM.

Again referring to FIG. 1, system 100 also has open system server 106 that includes a DBMS that is used for controlling the associated database system that is shown at 108. The open system server may be a SAN/Solaris server. The DBMS and the database may be an Oracle DBMS and Oracle disks, respectively.

Host 110 is the system 100 element through which mainframe/DBMS 102 connect to mainframe control unit/database disks 104, and open system server/DBMS connects to open server disks 108. Host 110 includes intelligent splitter 112 that connects mainframe/DBMS 102 connect to mainframe control unit/database disks 104. Further, host 110 has interface 114 that connects open system server/DBMS 106 to open system database disks 108. Host 110 also provides connectivity between splitter 112 and interface 114 so that propagation in accordance with the present invention can take place.

According to FIG. 1, host 110 uses one port of splitter 112 to handle ESCON connectivity 116 to mainframe/DBMS 102 and second port to handle ESCON connectivity 118 to mainframe control unit/database disks 104. Host 110 also supports interface 114, which may be a fiber channel interface card. Fiber channel interface card 114 handles connectivity 120 to open system server/DBMS 106 and connectivity 122 to open system database disks 108.

The system and method of the present invention may be implemented in a system such as is shown in FIG. 1. In such a system, all "writes" to the logs of the source and target databases, and all "reads" to the target database are intercepted. The interception of this information or data takes place in the I/O streams. According to aspects of the present invention, host 110 may be programmed to direct splitter 112 to intercept all write commands in the I/O stream from mainframe/DBMS 102 and reads from the I/O stream from open system disks 108 as controlled by the open system server/DBMS 106.

The I/O intercepts and I/O based activity with regard to the present invention will be performed at host 110 and splitter 112 according in commonly assigned, co-pending U.S. patent application Ser. No. 09/605,493, titled "I/O System Supporting Extended Functions and Methods Thereof," the contents of which is incorporated by reference.

Figure 2:
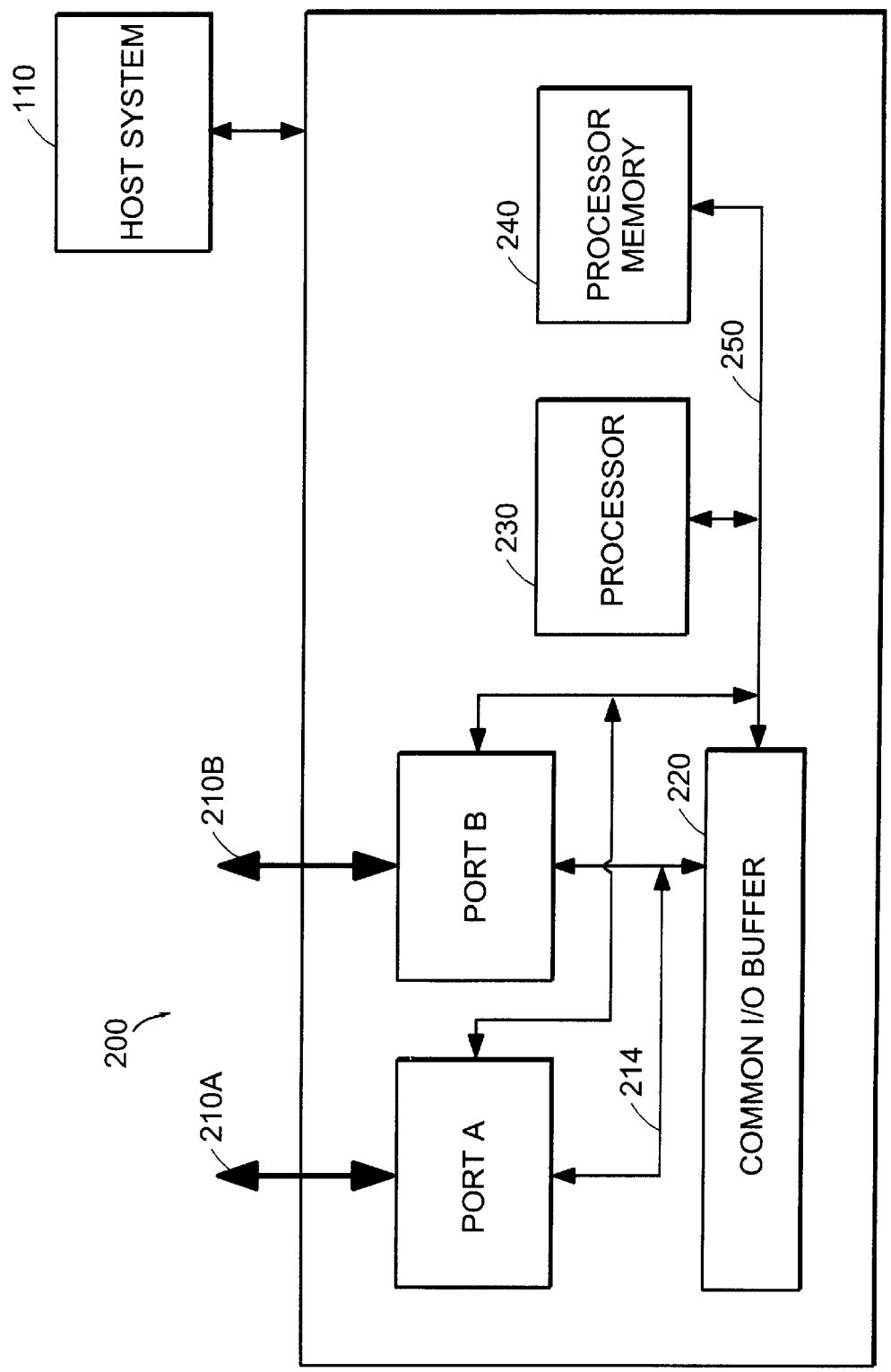
FIG. 2 shows a detailed representative view of a splitter that is used in implementing the present invention.

A detailed, representative view of splitter 112 is shown in FIG. 2, generally at 200. In FIG. 2, splitter 112 includes Port A, Port B, common I/O buffer 220, local processor 230, local processor memory 240, and communications bus 250. Ports A and B communicate with external connections 210A and 210B to receive and transmit data, for example, according to ESCON protocol. Each of the Ports also communicates with common I/O buffer 220 using bus 214. It is understood that each of the Ports has the capability of read visibility into the entire buffer and write visibility to specific buffer areas associated with the Port.

Common I/O buffer 220 is used to store frames received from an external link. It will also contain frames created by local processor 230. It is from I/O buffer 220 that update data is intercepted and inspected.

Local processor 230 runs software in memory 240 to control splitter 112. For example, local processor 230 may run software that can read and/or write states to the Ports to control operation. Further, since local processor 230 can communicate with common I/O buffer 220, programs may be run to read and/or write information to common I/O buffer 220. These latter programs, for example, may be used to inspect I/O streams.

Local bus 250 is used for communications among processor 230, common I/O buffer 220, Port A, Port B, and processor memory 240. This bus will permit interrupt, command, address, and data information to be passed among the components connected to bus 250. That is, bus 250 facilitates communications to the uniquely addressed components connected to it.

Figure 3:
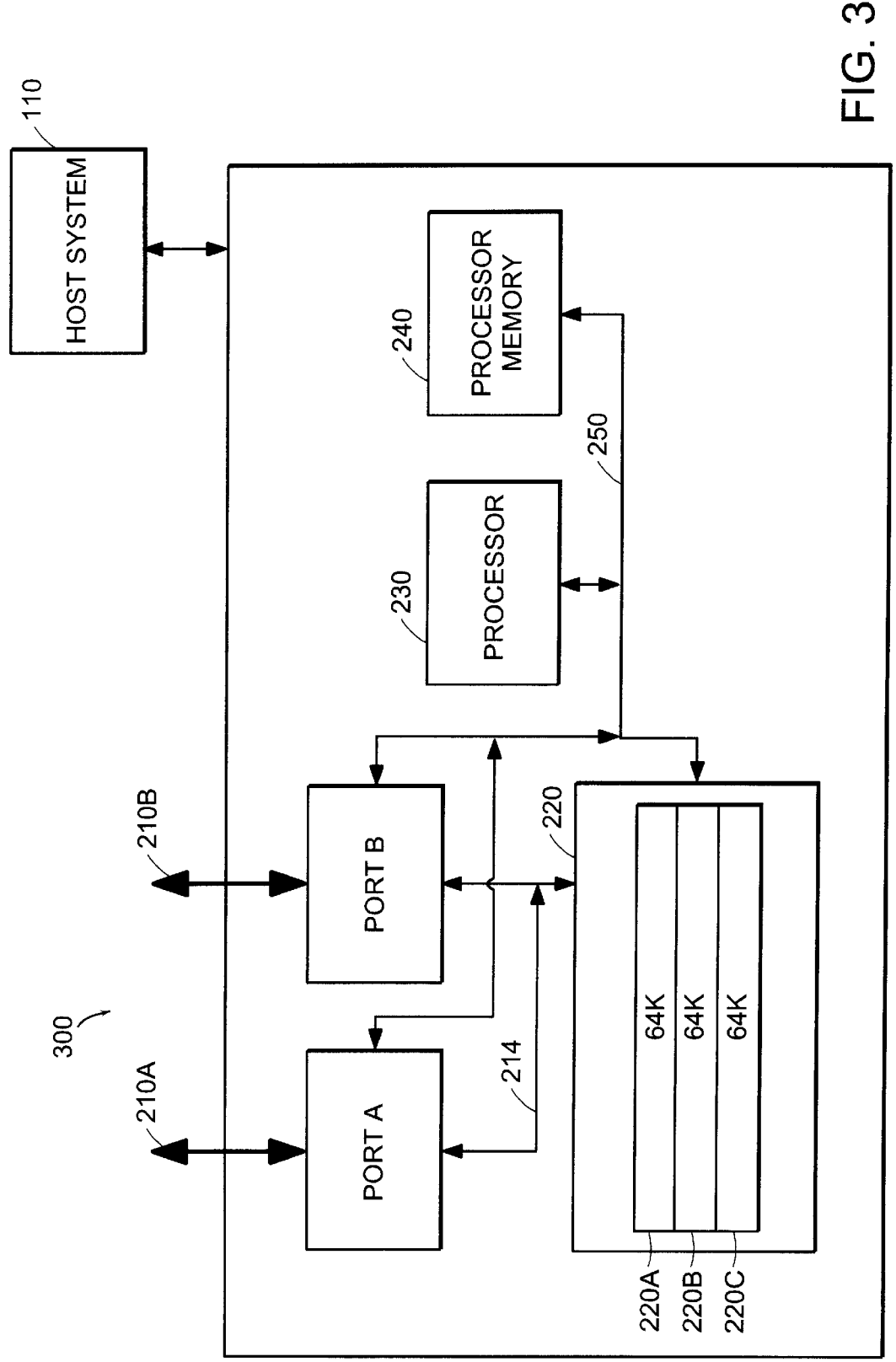
FIG. 3 shows detailed view of the common I/O buffer that is an element of the representative splitter shown in FIG. 2.

FIG. 3, generally at 300, shows splitter 112 that is shown in FIG. 2 with common I/O buffer 220 shown in greater detail. As is shown in FIG. 3, the unique address space of common I/O buffer 220 is subdivided so that each of the Ports and processor 230 is associated with a unique subaddress space. For example, common buffer 220 may be logically divided into three equal size, non-overlapping, memory segments 220A, 220B, and 220C. Port A may be associated with segment 220A, Port B with segment 220B, and processor 230 with segment 220C. This is only meant to be representative and other configurations of the I/O buffer are possible and still be within the scope of the present invention.

Again referring to FIG. 1, there are two databases systems shown. The first is shown as mainframe control unit/database 104 and the second as open system database 108. As described, each may be running on different software. For example, mainframe control unit/database 104 may be running Database2 software, while open system database 108 may be running an entirely different type of database software, such as Oracle database software. For purposes of description only, mainframe control unit/database 104 will be referred to as DB1, the source database, where the updates originate, and open system database 108 will be referred to as DB2, the target database, where the updates are to propagate.

DB1 and DB2 each have a database log associated with it. These data structures are used in implementing the present invention. Among other things, the DB1 source database log and DB2 target database log contain records for all update transactions and their associated records. For example, for update transaction i, $T_i$=Update ($R_i$, $R_j$, $R_k$, Read ($R_l$, $R_m$, $R_n$, $R_o$)), the following data would be recorded in the database log: $BT_i$, the begin transaction; the list of updated records with the updated new values, $R_{i,i}=V_i$, $R_{j,i}=V_j$, $R_{k,i}=V_k$; and $ET_i$, the end transaction.

Many transactions will be occurring concurrently and, as such, the recorded sequences of the multiple transactions will interleave. Therefore, if $T_i$ is being executed and concurrently Transaction j is being executed, $T_j$=Update ($R_{il}$, $R_{jl}$, $R_{kl}$, Read ($R_{ll}$, $R_{ml}$, $R_{nl}$, $R_{ol}$)), then the recorded sequence in the database log may appear as the following:

$$L=\{BT_i, R_{i,i}=V_i, R_{j,i}=V_j, BT_j, R_{il,i}=V_{il}, R_{k,i}=V_k, R_{jl,j}=V_{jl}, ET_i, R_{jl,j}=V_{jl}, R_{kl,j}=V_{kl}, ET_j\}$$

The system and method of the present invention, which carries out update propagation, preferably, includes four components. These components are source log processing, target log processing, update preprocessing, and update propagation to the target database. Source log processing creates the update domain for the update propagation transaction. Target log processing creates the update domain for the target transactions based on which transactions have to be rolled back before the update transaction starts. Update processing involves the destaging from the cache memory all of the records in the update domain of the update propagation transaction and roll back all pending target transactions that overlap the domain. Update propagation to the target database involves setting the time for λ, the maximum time for reads, to ensure that the target transactions atomicity is not violated in the "unsafe zone" of transaction duration and propagate the update to the target database and its log.

In order for the system and method of the present invention to operate properly, it is understood that reads and writes to storage in the source database and target database are intercepted in an I/O buffer, such as common I/O buffer 220 shown in FIGS. 2 an 3. Common I/O buffer 230 will contain the data of the read and write operations, and the disk addresses to and from where the data was read or written. The update domains U of the update propagation T=(U) are obtained by intercepting writes to the source database log. Similarly, the update domain $U_i$ for the target transaction $T_i$ is derived by intercepting all writes to the target database log.

The interception and extraction of reads (or $R_i$) is more involved given that the read operations do not appear in the target database log. When read operations are intercepted as they are executed directly to the database, there is no information that is readily available to indicate the transaction to which it belongs. Since this information is not available, there can be no determination whether a particular read operation violated the atomicity equation. More specifically, a read operation cannot be associated with any other read or write operation in the same transaction.

According to the system and method of the present invention, each read operation is assigned a maximum time limit $\lambda$. This will mean that no read transaction may take longer than $\lambda$ to complete. $\lambda$ may be set to any value but preferably it will be in milliseconds from predetermined events. The exact value of $\lambda$ may, however, depends on the particular application in which it is used. For example, $\lambda$ may equal to 300 ms in the Database2 update application.

When considering read operations in the context of the present invention, "r" will belong to the transaction of some other read or update operation, if that other read or update operation occurred within the same time interval $\lambda$ relative to "r." This applies to situations in the past and in the future relative to $\lambda$.

In light of read operations only being able to execute to locations, such as cache memory, there is not the possibility to intercept them and they are unnoticeable. The present invention overcomes this problem by flashing the read information from the cache and invalidating in the cache any record that belongs to the update domain of the update propagation transaction. This is realized when there is a start of the execution of an update propagation transaction T and there is the ability to track all of the target reads to the relevant records. Even using this process, it is possible to miss some of the relevant reads to relevant records before T started. This is consistent with the definitions set forth above relating to parallel transactions and atomicity since it could have happened before the start of T.

Referring the parallel transaction and atomicity definitions for this purpose, it is understood that based on these definition reads can only execute to a separate stored location such as a cache. It is done this way according to the present invention because to the second condition of the atomicity definition, namely, if $O((R \cup U) \cap U_i) > 1$, provides that all read/update operations which violate $O((R \cup U) \cap U_i) < 2$, occur either before T started or after T ended, then at least one read or update operation will have occur after T has started. As such, it is necessary only to track of relevant read and update records from the time T started for the interval $\lambda$ or until T ends, which ever occurs last. What then remains is to compensate for the particular missing read operations, if they exist, that occurred before T started by setting the atomicity equation to $O((R_i \cup U_i) \cap U) > 0$.

According to the system and method of the present invention, all parallel target transactions $T_i$ are rolled back to the update propagation transaction T for which $O((R_i \cup U_i) \cap U) > 0$. This will take place even before the transaction T starts executing. These same transactions may also be rolled back after update propagation transaction T starts. However, under these conditions, it is necessary to ensure that the atomicity rules are not violated.

The conditions under which the atomicity rule are not violated when the rollback takes place after update propagation transaction T has started executing is when the rollback process seeks to update one of the records in the update domain of transaction T and this record has already been updated by update propagation transaction T to a new value. A later rollback of transaction $T_i$, as a result of the update that occurred after T started, will not violate the atomicity rules since the rolled back values will reflect the updates made by update propagation transaction T.

Noting the foregoing, to properly carry out the system and method of the present invention, it is necessary to enforce the atomicity equation $O((R \cup U) \cap U_i) < 2$ by rolling back all transactions $T_i$ for $O((R_{im} \cup U_i) \cap U) > 1$. In fact, this rolling back may be considered to apply to all transaction for which $O((R \cup U) \cap U) > 0$.

As discussed above, the update propagation is carried out, preferably, using four components. These components are source log processing, target log processing, update preprocessing, and update propagation to the target database. Briefly, as discussed previously, source log processing creates the update domain for the update propagation transaction; target log processing creates the update domain for the target transactions based on which transactions have to be rolled back before the update transaction starts; update processing, which is the destaging from the cache memory all of the records in the update domain of the update propagation transaction and the rolling back of all pending target transactions that overlap the domain; and update propagation to the target database. Each of these components will now be discussed in detail.

Source Log Processing

The source log processing component of the system and method of the present invention will receive as its input parameter one log entry at a time. These log entries apply to the source database, which in the system shown in FIG. 1 would be mainframe control unit/database 104 that has been referred to as DB1. The source database is where the updates originate. The source database includes a source transaction update table that is referred to as SourceTransactionUpdateTable$_i$. This table lists all of the $T_i$s update records and the new values for these records. The ProcessSourceLog of the source database implements the SourceTransactionUpdateTable$_i$.

The ProcessSourceLog, as stated above, receives one input parameter. The log entries consist of the intercepted data and the entries are input to the log one at a time. The entries are data that has been intercepted by, and visible through, common I/O buffer 220 that is shown in FIG. 2. Accordingly, common I/O buffer 220 will contain the successive intercepted source log data that has been input to the system. That is, I/O buffer 220 will contain the next intercepted source log I/O data. This intercepted data will provide the SourceTransactionUpdateTable$_i$ with the data it will form a list of tables for all of the open source transactions. The source log processing component will operate according to the following:

```
ProcessSourceLog(IObuffer, SourceTransactionUpdateTable)
{
    if IObuffer contains $BT_k$ then
        create new table SourceTransactionUpdateTable$_k$
    if IObuffer contains $R_{j,k}$ and its value $V_j$ then
        add $R_j$ and its value $V_j$ to SourceTransactionUpdateTable$_k$
    if IObuffer contains $ET_k$ then
        mark Source TransactionUpdateTable$_i$ as ready for update
        propagation
    if IObuffer contains $AT_k$ then/* is an abort transaction marker */
        clear and release SourceTransactionUpdateTable$_k$
}
```

The results of the source log processing will be the listing of all of the source transactions that will be available for use by the system components.

Target Log Processing

The second component is the target log processing component. This component is to track all of the pending target transactions that execute in parallel to the update propagation transaction. These log entries apply to the database which in the system shown in FIG. 1 is open system database 108. This database has been previously referred to as DB2, the target database where the updates are to propagate.

The purpose of obtaining this target log information is to rollback all of the parallel target transactions $T_i$ to the update propagation transaction T for which $O(U_i \cap U) > 0$. As stated previously, this may take place before transaction T has started executing.

Similar to the source log processing component, the input parameter to the target log processing component will be one log entry at a time. These input parameters will be included in TargetTransactionUpdateTable$_i$. The list will include $T_i$ update records and their new values.

The TargetTransactionUpdateTable$_i$ is implemented through the ProcessTargetLog that is part the target database. The input parameters are received from the common I/O buffer 220 that is shown in FIG. 2. That is, the entries are data that has been intercepted by, and visible through, common I/O buffer 220. Common I/O buffer 220 will contain the successive intercepted source log data that has been input to the system. This intercepted data will provide the Target TransactionUpdateTable$_i$ with the data it will form a list of tables of all open transactions. The target log processing component operates according to the following:

```
ProcessTargetLog(IObuffer, TargetTransactionUpdateTable)
{
    if IObuffer contains $BT_k$ then
        create new table TargetTransactionUpdateTable$_k$
    if IObuffer contains $r_{j,k}$ and its value $V_j$ then
        add $r_j$ and its value $V_j$ to TargetTransactionUpdateTable$_k$
    if IObuffer contains $ET_k$ then
        clear and release TransactionUpdateTable$_k$
    if IObuffer contains $AT_k$ then /* is an abort transaction marker */
        clear and release SourceTransactionUpdateTable$_k$
}
```

The results of the target log processing will be the listing of all of the transactions that will be available for use by the system components in update propagation.

Update Preprocessing

The third component is the update preprocessing component. This component, preferably, is executed before applying the update propagation transaction that may be in a SourceTransactionUpdateTable$_k$. When the update preprocessing component is operated, preferably, two operations will take place. The first is that the cache containing the read information will be flashed to obtain this information. Next, the flashed cache locations will have those locations invalidated that correspond to each of the records in the SourceTransactionUpdateTable$_k$. The second is that there will be a rolling back of all open target transaction $T_i$ for those cases in which $O(U_i \cap U) > 0$.

The update preprocessing component preferably has two input parameters. These parameters are obtained from SourceTransactionUpdateTable$_k$ and TargetTransactionUpdateTable$_k$. As discussed, SourceTransactionUpdateTable$_k$ will contain the list of records to be updated by update propagation transaction and TargetTransactionUpdateTable$_k$ will contain a list of target transactions that have not been committed to a transaction T. The operation of the update preprocessing component is as follows:

UpdatePreprocessing (SourceTransactionUpdateTable$_k$, TargetTransactionUpdateTable)

```
{
    for each record in each TargetTransactionUpdateTable$_i$ do
    {
        If TargetTransactionUpdateTable$_i$ ∩
        SourceTransactionUpdateTable$_k$ ≠ 0 then Rollback
        Transaction(k)
    }
    for each record $R_i$ in SourceTransactionUpdateTable$_k$ do
    {
        Map $R_i$ to the corresponding record $r_i$
        Destage($r_i$)
    }
}
```

The purpose of the update processing component is to prepare for updating the target database. This component has looked at the tables in the source and target logs and ensured that upon executing the update propagation to the target database there will not be any violation of the atomicity rules. Moreover, the update preprocessing component will also look to ensure that the reads from the target database do not violate these rules.

Update Propagation

The update propagation component's primary function is to propagate updates to the target database. This is accomplished by executing an update transaction T based on the values in a SourceTransactionUpdateTable$_i$. When the update transaction T starts, it will cause a timer to be initiated after a predetermined number of λ units have expired. When this timer expires, it will remove the particular SourceTransactionUpdateTable$_i$ from the system. It will also be removed if the transaction is completed before the timer expires. The controlling event of the two will be the one that happens last. During the operation of the update propagation component, the system and method of the present invention will evaluate the impact of transaction T on the atomicity of any other target transactions until the SourceTransactionUpdateTable$_i$ has been removed from the system.

The update propagation component receives one parameter. This parameter is what is present in SourceTransactionUpdateTable$_i$. These will be the lists or records to be updated and their corresponding update values. The update propagation component operates according to the following:

```
UpdateDB(SourceTransactionUpdateTable_i)
{
    set timer event in T time unites for a SourceTransactionUpdateTable_i
    /*propagate updates
    Create new unique transaction id (k)
    Write BT_k to the log
    for each mapped record r_i in SourceTransactionUpdateTable_i do
    {
        read r_j before-image value BV_j
        write r_{j,k} and its before-image value BV_j to the target log
        write value V_i to record r_i
        write r_{j,k} and its value to the target log
    }
    Write ET_k to the log
```

Once the update propagation process has been carried out, the target database will be update with the desired new information at the I/O stream without the need to use valuable CPU time or TCP/IP communications lines.

It is understood that in discussing the update process of the present invention that the database operations of rollback and flashing the cache may be programmed. It is also understood that the actions of rollback and flashing the cache are performed conventionally.

Considering the system and method as described above, and embodiment of the invention is carried out according to the following:

```
UpdatePropagation()
{
    do forever
    {
        intercept next read or write operation to IObuffer
        case(IObuffer)
        {
            write to source log database:
                /*add record to the right TransactionUpdateTable
                ProcessSourceLog(IObuffer,
                SourceTransactionUpdateTable)
                Write record to source log /*forward write to
                destination
                If record is ET_j then /*start update propagation
                transaction
                    /*spun update propagation sequence to be
                    executed as a separate task
                    /*parallel with intercepting reads and writes
                    fork (UpdateDB(TransactionUpdateTable_i))
            write record r_{j,k} to target log:
                ProcessTargetLog(IObuffer,
                TargetTransactionUpdateTable)
                Write record to target log /*Forward write to destination
                /*if write compromising transaction's consistency rollback
                the transaction
                If r_{j,k} such that r_j in SourceTransactionUpdateTable then
                {
                    RollbackTransaction(k)
                    clear TargetTransactionTable_k
                }
            read r from target database
                /*if reads compromise transaction's atomicity rollback
                transaction
                if r such that r in some SourceTransactionUpdateTable then
                    RollBackRecord(r)
        }/*end case
    }/*end do forever
    Time event interrupt for transaction j:
        If SourcePendingTransactionTable_j not cleared yet and
        marked completed
        then
            Clear SourceTransactionUpdateTable_j
    End of update propagation transaction task for
    SourceTransactionUpdateTable_j:
```
```
        if time event for SourceTransactionUpdateTable_j occurred
        already then
            Clear SourceTransactionUpdateTable_j
        else
            mark SourceTransactionUpdateTable_j as completed
}
```

In another embodiment of the system and method of the present invention, the updates will not only be written to the target database but they will be written in the source database log as a new transaction. This will permit the tracking of the update events for action at a later time, such a database reconstruction or recovering.

The terms and expressions that are used herein are meant to be terms of expression and not limitation. And there is no intention in the use of such terms and expressions of excluding the equivalents of the features shown and described or portions thereon, it being recognized that various modifications are possible within the scope of the present invention.

What is claimed is:

1. A method for updating system databases when at least source and target system databases are associated with different system platforms, the method comprising the steps of:

(a) intercepting write inputs to, and read inputs from a plurality of system databases as such write and read inputs are present in input/output ("I/O") streams of the system;

(b) inspecting the intercepted write and read inputs to determine the write and read inputs that are for updating system databases;

(c) listing in a source database log of the source system database the write and read inputs that are for updating the source database;

(d) listing in a target database log of the target system database the write and read inputs that are for updating the source database;

(e) writing to the source database the write and read inputs that are for updating the source database; and (f) writing to the target database the write and read inputs that are for updating the source database.

2. The method as recited in claim 1, wherein write and read inputs are intercepted by an I/O buffer.

3. The method as recited in claim 2, wherein the intercepted write and read inputs are visible through the I/O buffer.

4. The method as recited in claim 1, wherein the write and read inputs that are for updating the source database are input one at a time to the source database log.

5. The method as recited in claim 1, wherein the write and read inputs that are for updating the source database are input one at a time to the target database log.

6. The method as recited in claim 1, wherein the updates are written to the target database on a non-interfering basis with other transactions affecting the target database.

7. The method as recited in claim 6, wherein when writing the updates to the target database interferes with other transactions affecting the target database, the writing update transaction will be rolled back to a non-interfering time.

8. The method as recited in claim 1, wherein the source database is operated according to first database software.

9. The method as recited in claim 8, wherein the target database is operated according to second database software.

10. A method for propagating cross-platform database updates for a system, comprising the steps of:
- (a) intercepting a write or read that is input to an Input/Output ("I/O") buffer, with the write or read being intended for updating a source database;
- (b) writing each write to a source database log and a target database log:
- (c) reading each read from the target database and associating the read with a transaction listed in the source database log and the target database log;
- (d) writing the updates from the source database log to the source database; and
- (e) writing the updates from the target database log to the target database, according to timing that is free from interfering with other transactions affecting the target database.

11. The method as recited in claim 10, wherein the intercepted writes and reads are visible through the I/O buffer.

12. The method as recited in claim 10, wherein the writes and reads that are for updating the source database are input one at a time to the source database log.

13. The method as recited in claim 10, wherein the writes and reads that are for updating the source database are input one at a time to the target database log.

14. The method as recited in claim 10, wherein the source database is operated according to first database software.

15. The method as recited in claim 14, wherein the target database is operated according to second database software.

16. The method as recited in claim 10, wherein when writing the updates to the target database interferes with other transactions affecting the target database, the writing update transaction will be rolled back to a non-interfering time.

17. A system for propagating cross-platform database updates, comprising:
- a first platform that further includes,
  - a first database, with the first database including a first database log for receiving update write and read information, and
  - a first processor that connects to, and controls operation of the first database
- a second platform that further includes,
  - a second database, with the second database including a second database log for receiving update write and read information, and
  - a second processor that connects to, and controls operation of the second database; and
- a host that is disposed between the first processor and database and between the second processor and database, with the host further including,
  - an I/O buffer that intercepts for writes and reads for updating the first and second databases,
  - processor means for writing the updates to the first and second databases, with the processor means controlling the writing of the updates to the second database in a non-interfering manner with other transactions affecting the second database.

18. The system as recited in claim 17, wherein the first database is operated according to first database software.

19. The system as recited in claim 18, wherein the second database is operated according to second database software.

\* \* \* \* \*